(12) United States Patent
Horneman et al.

(10) Patent No.: US 7,170,928 B1
(45) Date of Patent: Jan. 30, 2007

(54) DETERMINATION OF DATA RATE, BASED ON POWER SPECTRAL DENSITY ESTIMATES

(75) Inventors: Kari Horneman, Oulu (FI); Jyrki Keisala, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/070,892

(22) PCT Filed: Sep. 9, 1999

(86) PCT No.: PCT/EP99/06719

§ 371 (c)(1),
(2), (4) Date: Sep. 9, 2002

(87) PCT Pub. No.: WO01/19043

PCT Pub. Date: Mar. 15, 2001

(51) Int. Cl.
*H04B 3/46* (2006.01)
*H04L 25/02* (2006.01)

(52) U.S. Cl. ............... 375/225; 375/316; 370/335

(58) Field of Classification Search ............. 375/341, 375/295, 130, 146, 225, 242, 262, 377, 316, 375/224; 714/795; 370/335, 342, 252, 347, 370/310.2, 345, 522; 704/207
See application file for complete search history.

(56) References Cited

U.S. PATENT DOCUMENTS

| | | | | |
|---|---|---|---|---|
| 4,887,280 A | * | 12/1989 | Reisenfeld | 375/377 |
| 5,619,524 A | * | 4/1997 | Ling et al. | 375/130 |
| 5,761,634 A | | 6/1998 | Stewart et al. | |
| 5,978,428 A | * | 11/1999 | Hayashi | 375/377 |
| 5,987,018 A | * | 11/1999 | Freeburg et al. | 370/310.2 |
| 6,163,577 A | * | 12/2000 | Ekudden et al. | 375/242 |
| 6,414,948 B1 | * | 7/2002 | Sato | 370/335 |
| 6,519,292 B1 | * | 2/2003 | Sakoda et al. | 375/295 |
| 6,639,954 B2 | * | 10/2003 | Kuroiwa et al. | 375/341 |

FOREIGN PATENT DOCUMENTS

| | | |
|---|---|---|
| EP | 0944212 | 9/1999 |
| GB | 2301999 | 12/1996 |
| GB | 2330992 | 5/1999 |
| JP | 08-509348 | 10/1996 |
| JP | 9-172428 | 6/1997 |
| JP | 11-150522 | 6/1999 |
| JP | 11-220778 | 8/1999 |
| WO | WO 95/22818 | 8/1995 |

OTHER PUBLICATIONS

English Abstract of Japanese Patent Publication No. JP 11150522, published Jun. 2, 1999.

(Continued)

*Primary Examiner*—Temesghen Ghebretinsae

(57) ABSTRACT

The present invention relates to a method and a circuitry for estimating data transmission rate in a communication system. The communication system utilizes variable data transmission rates. A transmission signal between two stations of the system includes a plurality of data symbols over a sequence of data frames. A data frame of a received transmission signal is classified in accordance with a predefined classification of the data transmission rates, whereafter the data transmission rate of the received data frame is estimated on basis of said classification.

10 Claims, 4 Drawing Sheets

OTHER PUBLICATIONS

Patent Abstracts of Japan Publication No. 09-172428, pulished Jun. 30, 1997.

Patent Abstracts of Japan Publication No. 11-220778, published Oct. 8, 1999.

"An optimum generalized cross-spectrum symbol-rate detector" by IEEE Transactions on Communications, vol. 41, No. 9, Sep. 1993.

"On a Timing Recovery Technique for a Variable Symbol Rate Signal" J. Lee et al, IEEE 1997.

* cited by examiner

| DPDCH | Data bits of unknown rate | |
|---|---|---|
| DPCCH | PILOT | TPC |

DETERMINATION OF DATA RATE, BASED ON POWER SPECTRAL DENSITY ESTIMATES

CROSS-REFERENCE TO RELATED APPLICATION

Priority is claimed from International Application PCT/EP99/06719, filed Sep. 9, 1999.

FIELD OF THE INVENTION

The present invention relates to a method and circuitry for estimating data rates of signals transmitted between stations in a communication system, and more particularly, but not explicitly, between stations in a cellular code division multiple access (CDMA) communication system.

BACKGROUND OF THE INVENTION

In a communication system signals can be transmitted with variable data transmission rates wherein data is transmitted as a plurality of data symbols in subsequent data frames. As is known, in a cellular CDMA (Code Division Multiple Access) system data is encoded for transmission by modulating data symbols to be transmitted by a spreading code and a unique scrambling code for each channel. Within each cell of the cellular communication system, scrambling codes are preferably as far as possible orthogonal to allow for a plurality of different mobile stations to communicate with a base station on selectively coded channels. The effect of a spreading code is to spread the frequency band for transmission to a chip rate Tc which is larger than the bit rate $T_b$. The scrambling code is unique for each mobile station transmitting to a single base station so that the transmission from individual mobile stations can be distinguished at the base station. The spreading codes are also as orthogonal as possible within users. For example, it is possible to set up such a variable-rate connection where the data rate of the information bits, and thus the spreading factor used in the spreading modulation of these bits, varies from radio frame to radio frame (e.g. every 10 ms). The data rates used in such a connection are not arbitrary, but for each radio frame duration, one of the pre-defined data rates is used. Moreover, every higher data rate is dividable by a lower data rate, the division factor being $2^k$ for some $k \geq 0$. This specification presents variable-rate connection data rates 32, 64, 128, 256, 512, and 1024 kbps, but it is evident that also other data rates could be used without departing from the basic concept of the variable data rate (or multirate) transmission.

When a signal is transmitted between a base station and a mobile station (either on the uplink or the downlink) of a CDMA system, the signal receiving unit needs to establish from the received signal some information about the communication path along which the signal has travelled. This is referred to herein as "channel estimation" and is usually carried out in a channel estimation unit which generates a channel impulse response. Various techniques are known for channel estimation. The channel impulse response is required in order to properly decode and demodulate incoming data.

The data transmission rate of the received signal can be used in the channel estimation. However, if the data rate of a received radio frame is not known at the time of the detection at the receiver, the information symbols in said radio frame are usually obtained by means of detecting the complex data symbols assuming that the highest-possible data rate is used for transmission, and using the lowest-possible spreading factor in the receiving station. Assuming that the data rate of the received radio frame was 1024 kbps, this corresponds to the spreading factor of 4 (at 4.096 Mcps) used in the detection of the data symbols. The result of this detection should be a data vector of all detected complex information symbols corresponding to the received radio frame. Thereafter it has to be estimated what was the actual data rate of the signal at the transmitting station during the transmission. For example, this stage might give a decision that the actual data rate in the received radio frame was 256 kbps, not the assumed 1024 kbps. Finally, in accordance with the estimated data rate, as many adjacent symbols as necessary are summed together to get one actual information symbol. In this example, this would lead to summing up every four adjacent symbols to get one actual information symbol. Therefore it would be advantageous to be able to have the actual data rate of the transmission at the time of the detection at the receiver circuitry.

The transmission between the stations may or may not include explicit information of the data rates of the transmitted signal. In the first case, i.e. if the variable-rate connection includes explicit information on the used data rates for each received radio frame, this information is usually given in a separate channel, for example in an DPCCH (Dedicated Physical Control Channel). However, this information is often encoded in such a way that the actual data rate of the received radio frame is not known at the time the data symbols of the radio frame are detected. In addition, it may be necessary to establish another estimate of the data rate, for instance for the purposes of verification and/or correction of the received data rate information. In the latter case, i.e. if the explicit information is not included in the received signal, so called unknown or blind data rate estimation may be used at the receiving station in order to define at the receiver the actual data rate of the received signal.

One prior art proposal for detecting the data rate of the received signal is based on the power difference of the received bits in the data channel and the control channel. This method is relatively simple as it requires only the average power estimates of the received control symbols and data symbols. However, the disadvantage of the method is that if a very low spreading factor is used in detecting the data symbols (4 in the above example) in the first place noise becomes very dominant in the detection process. This degrades substantially the performance of the data symbol power estimation.

Another prior art method is based on CRC (Cyclic Redundancy Check: an error detection signal) decoding of the received signal. The method is based on a data rate assumption at each decoding stage and a subsequent selection of a data rate which gives a correct CRC word. To give an example, assuming that the possible data rates are 32, 64, 128, 256, 512, and 1024 kbps, a CRC check would be calculated directly for the information symbols of the received radio frame by assuming firstly a data rate of 1024 kbps. The resulting CRC word is stored. Two adjacent received symbols are summed together, assuming a data rate of 512 kbps, and a further CRC check is calculated for these information symbols. The resulting CRC word is stored. The process continues summing two adjacent information symbols together and calculating CRC checks for all these information streams until a lowest-possible data rate is achieved. Thereafter the stored CRC words are verified and such a data rate is selected that corresponds the rate used in the transmitter when a right CRC check was obtained (if such existed at all). A disadvantage of this method is that it is computationally complex: if there are N possible data rates, this requires N consequent CRC decoding processes before a decision of the transmitter data rate can be made. Moreover, the method does not give any data rate if the algorithm does not give an exactly matching CRC check.

One prior art proposal is based on metrics of Viterbi decoding of the data, assuming (as in the CRC method) a certain data rate at each stage of the decoding process. This method, however, is also computationally complex and uses assumptions which may lead to even more complicated arithmetical operations and/or inaccurate results of the estimation procedure.

An additional disadvantage of the two latter prior art methods is that they delay the final decision of the data rate of the received signal to a stage where some decoding of the data is needed for the first time. This will make the operation difficult for receiver structures that require an estimate of the data transmission rates of the received signals at an earlier stage than decoding. One such receiver comprises an Interference Cancellation (IC) receiver.

SUMMARY OF THE INVENTION

It is an aim of the embodiments of the present invention to address one or several of the disadvantages of the prior art data rate estimation and/or to provide a new type of solution for data rate estimation.

According to an aspect of the present invention there is provided a method for estimating data transmission rate in a communication system with variable data transmission rates wherein a transmission signal includes a plurality of data symbols over a sequence of data frames, the method comprising steps of classifying a data frame of a received transmission signal in accordance with a predefined classification of the data transmission rates and estimating the data transmission rate of the received data frame on basis of said classification.

According to a more specific embodiment, the classification is based on frequency content of the received transmission signal. The classification can be based on a power spectral density function estimate of the received transmission signal. The power spectral density function estimate can be calculated using a Fast Fourier Transform algorithm and coherent averaging of the data symbol sequence of the received transmission signal.

The power spectral density function estimate can also be normalised by summing the elements of the power spectral density function for obtaining a sum of the elements and by dividing each of said elements by the sum.

Effect of noise can be removed by subtracting an inverse of the number of elements of the power spectral density function from the power spectral density function.

The classification can comprise further steps of calculating a variable from the power spectral density function for characterising the frequency content of the power spectral density function, and comparing the variable against limit values of a classification-decision structure.

The estimated data transmission rate can be used in channel estimation.

According to another aspect of the present invention there is provided a signal receiving circuitry for use in a communication system with variable data transmission rates wherein data is transmitted as a plurality of data symbols over a sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame.

According to a more specific embodiment, the signal receiving circuitry is included in a mobile station and/or a base station of a cellular communication system.

The embodiments of the present invention provide several advantages. The embodiments of the invention can be used in a situation where no rate information is transmitted. In addition, the embodiments of the invention can be used in a situation where the rate information is transmitted but cannot, for reason or another, be used or detected from the signal during the receiving process. In addition, one possible use is to provide an additional data rate information which can be used e.g. for correction or error check of a rate information detected from the transmitted signal. The estimate of data transmission rate can also be used in other parts of the received signal processing sequence, e.g. in an IC receiver. The possibility for an early detection of the unknown data rate enables use of any such receiver structure which makes use of the data rate information at an early stage. The estimate can also be used to assist in rate selection for Viterbi decoding of the incoming data symbols, or to assist in decision of an alternative transmission rate for decoding if an error check fails. In addition, embodiments of the invention may assist in provision of a system that is less sensitive to SNR (Signal-to-Noise Ratio) fluctuation.

BRIEF DESCRIPTION OF DRAWINGS

For a better understanding of the invention and to show how the same may be carried into effect reference will now be made by way of example to the accompanying drawings in which.

DESCRIPTION OF PREFERRED EMBODIMENTS OF THE INVENTION

Figures 1, 3:
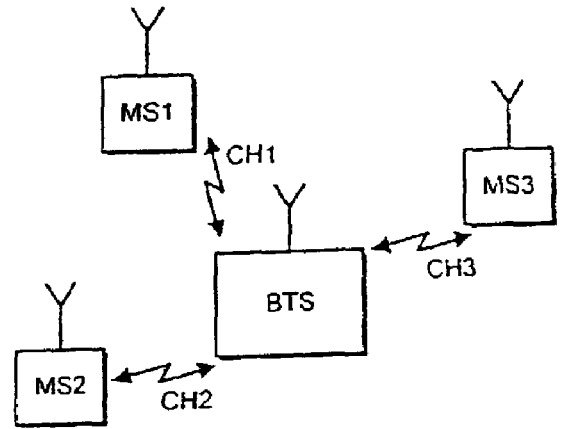
FIG. 1 is a block diagram of a mobile communication system.
FIG. 3 illustrates a slot structure for physical channels for a transmission with unknown data rate.
Figure 2:
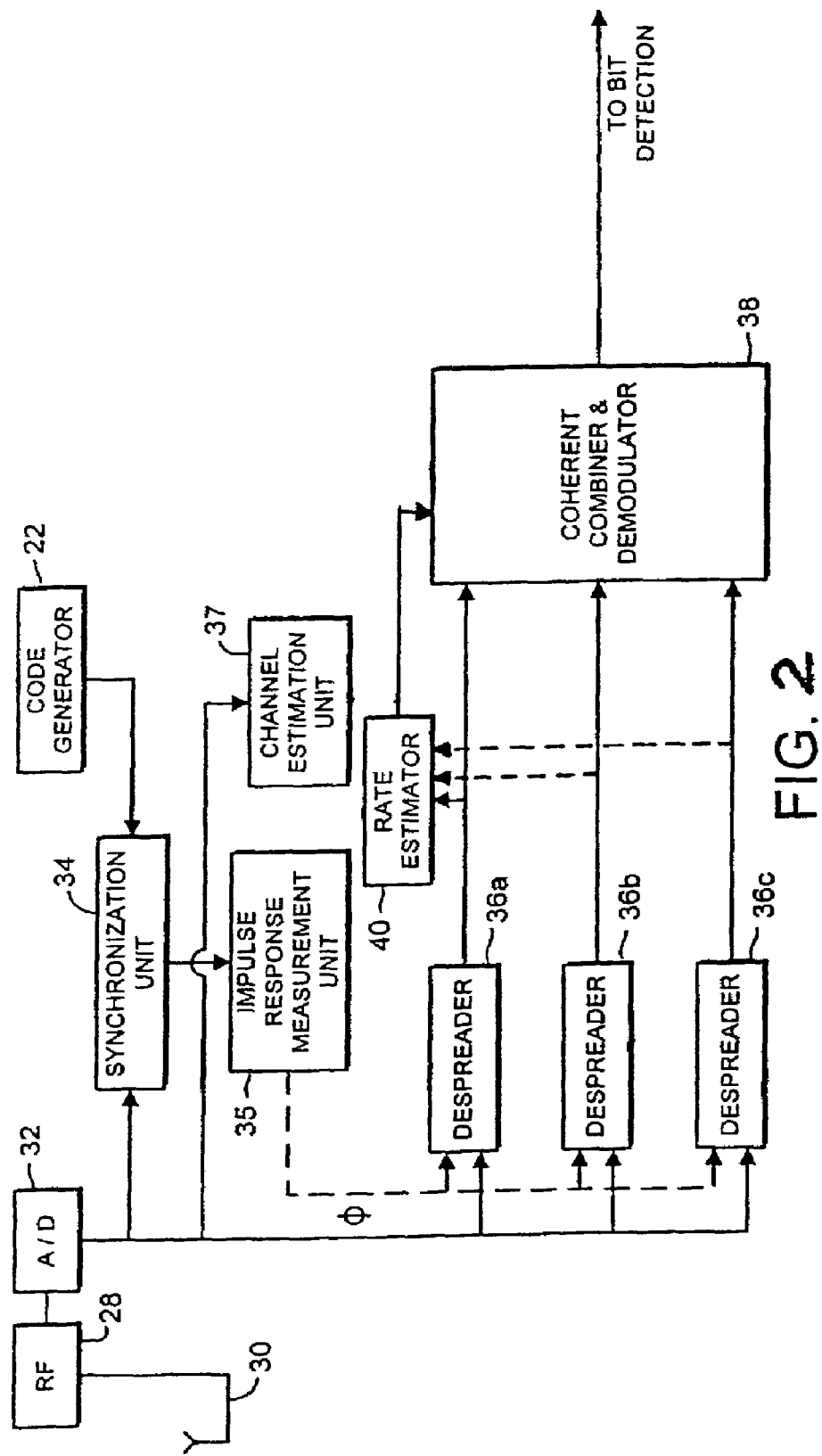
FIG. 2 illustrates a reception circuitry in a station.

FIG. 1 is a block diagram illustrating a context in which the present invention may be used. That is, a CDMA mobile communication system allows a plurality of mobile stations MS1, MS2, MS3 to communicate with a base (transceiver) station BTS in a common cell via respective channels CH1, CH2, CH3. These channels are distinguished from one another by the use of scrambling codes in a manner which is know per se. FIG. 2 is a block diagram of a receive circuitry at a base station in a WCDMA system (Wideband CDMA). The receive circuitry of FIG. 2 is for use in uplink direction, i.e. for receiving signals from the mobile stations (MS). It is noted that even though the actual receive circuitry implementation in the downlink direction, i.e. at the mobile station, can be somewhat different, the invention is applicable to downlink transmissions as well.

Before describing the exemplifying receiving circuitry of FIG. 2 in more detail, a transmit circuitry (not shown) within a transmitting station will be briefly described. Data to be transmitted between a MS and a BTS may be speech data, video data or other data. The data is encoded into a form suitable for transmission at a bit rate $T_b$ which is dependent on the source of the data, as discussed above. The encoded user data is supplied to a frame multiplexer. The user data can also be supplied to a CRC encoder which generates a check sequence (CRC) for each frame of data. Error correction coding and bit interleaving of the frame sequence can be accomplished prior to transmission in a manner known in the art. The error correction is used in order to protect the user data from errors in a radio channel so that e.g. a Viterbi decoder can recover the coded data even if some of the bits are corrupted. For error coding and decoding purposes, tail bits defining the end of each user data sequence can also be added to the end of user data sequence. Bit interleaving spreads burst errors which typically occur in radio channels more evenly in time to allow the decoder to more efficiently correct the errors from the coded data.

A frame multiplexer organises the data for transmission into a frame sequence. FIG. 3 illustrates an example of a slot structure for physical channels DPCCH (Dedicated Physical Control Channel) and DPDCH (Dedicated Physical Data Channel) in the frame sequence. The DPCCH part of the frame contains a pilot sequence (PILOT), a possible rate information (RI) sequence (not shown) and a transmission power control (TPC) sequence. The DPDCH part of the frame contains the whole interleaved user data sequence (user bits and possible CRC bits and possible tail bits). Typically, the user data of the DPDCH is divided into frame periods of 10 milliseconds each, and each frame can have a different transmission rate. Thus, it is possible to multiplex data from different sources into the frame sequence for transmission and to provide different transmission rates in different frames of the frame sequence. In the following exemplifying embodiments the data rate detection is subjected to the DPDCH sequence of the frame.

The frame sequence is supplied to a spreader which receives spreading and scrambling codes from a code generator. The spreading and scrambling codes are generated in accordance with known CDMA techniques and will not be described further herein. The effect of the spreading code is to spread the frequency band for transmission to a chip rate Tc which is larger than the bit rate $T_b$. As explained, the scrambling code is unique for each mobile station transmitting to a single base station so that the transmission from individual mobile stations can be distinguished at the base station. If M parallel code channels are employed, M data symbols are spread using different codes and then the results are summed together. The spread signal is supplied to a modulator which modulates the signal ready for transmission, for example according to QPSK modulation. In some systems, modulation is carried out prior to spreading. This sequence of events, however, has no impact on the present invention. The spread, modulated signal is supplied to a digital to analogue (D/A) converter and from there to an RF unit which supplies the signal ready for transmission.

The reception side of the uplink connection will now be described with reference to FIG. 2. Signals incoming at an antenna 30 are received by an RF unit 28 and supplied to an analogue to digital (A/D) converter 32. It will readily be understood that a signal may arrive at the receiving station having experienced multipaths with differing propagation delays dn. The A/D converter 32 supplies the digital input signal to a synchronisation unit 34, a channel estimation unit 37 and to each of a number of despreaders 36a, 36b, 36c. The number of despreaders depends on the likely number of paths experienced by the signal from the base station to the mobile station and is thus dependent on the environment.

The synchronisation unit 34 handles the synchronisation of the mobile station to the base station BTS after power has been turned on as well as in a handover case. This includes searching for signals which have been transmitted with the unique scrambling code for that mobile station. Thus, the synchronisation unit 34 receives the unique code from the code generator 22. To perform the search function, synchronisation unit utilises the unique code from the code generator 22 and correlates it with the incoming signal until a strong correlation is detected. After the synchronisation procedure is completed, a dedicated traffic channel can be established. An impulse response measurement unit 35 deals with estimation of the propagation delays dn in order to be able to provide each despreader 36a, 36b, 36c with required scrambling code phases Ø. The phase value of the strongest correlation is supplied to the first despreader 36a and the process is continued to supply respective phase values Ø to the remaining despreaders 36b and 36c. Respective code generators within the despreaders 36a to 36c can thus be used to despread the signal in accordance with the determined phase difference and the resulting narrowband signals are supplied to a coherent combiner and demodulator unit 38.

A channel phase estimate from the channel estimation unit 37 is needed for the combining and demodulation process of the data symbols. Furthermore, an estimate of the data rate is needed from a rate estimator 40 in order to be able to decide how many successful data symbols are to be summed together.

The combined demodulated signal is supplied to a bit detection unit (not shown) which makes a soft or hard decision on the received symbols as to the transmitted bits. The detected bit sequence from the bit detection unit is supplied to a deinterleaving unit (not shown) which effectively undoes the action of the interleaver of the transmitter. The deinterleaved signal can be supplied further to a decoder (not shown) which decodes the error correction coded bits back to the sent user bits and possible CRC bits.

It is noted that several alternative circuit structures to the embodiment shown in FIG. 2 are possible to implement the embodiments of the present invention. However, it is generally advisable to have the rate estimation carried out as soon as possible in the receiving process so that it does not hold up the data rate estimation for longer than is necessary.

As already briefly mentioned above, the circuit is provided with the rate estimator unit 40 arranged to receive the despread signal from the despreader 36a. The signal from despreader 36a is assumed to be the strongest signal (i.e. that which has come in along the primary path). As shown by the dashed lines between the signals (branches) from the despreaders 36b and 36c, it is also possible to supply information from a plurality of the despreaders to the rate estimator. According to an option (not shown) more than one estimator 40 is provided in the circuitry. If a plurality of estimators is used, each of the estimators may estimate the data rate of a single signal output branch from despreaders 36a to 36c. Two or several signal branches may also be combined prior to estimation in one of the several estimators, e.g. such that the one estimator estimates the strongest signal while a second estimator estimates the two next strongest paths and so on.

The rate estimator 40 estimates the data transmission rate by examining the structure of the despread data. The following will describe an embodiment for estimating the transmission data rate of subsequent frames by classifying the data rate of a received signal at the estimator 40 into one of predefined categories, whereafter the decision of the actual data rate of the received signal is based on the predefined category.

Figure 4:
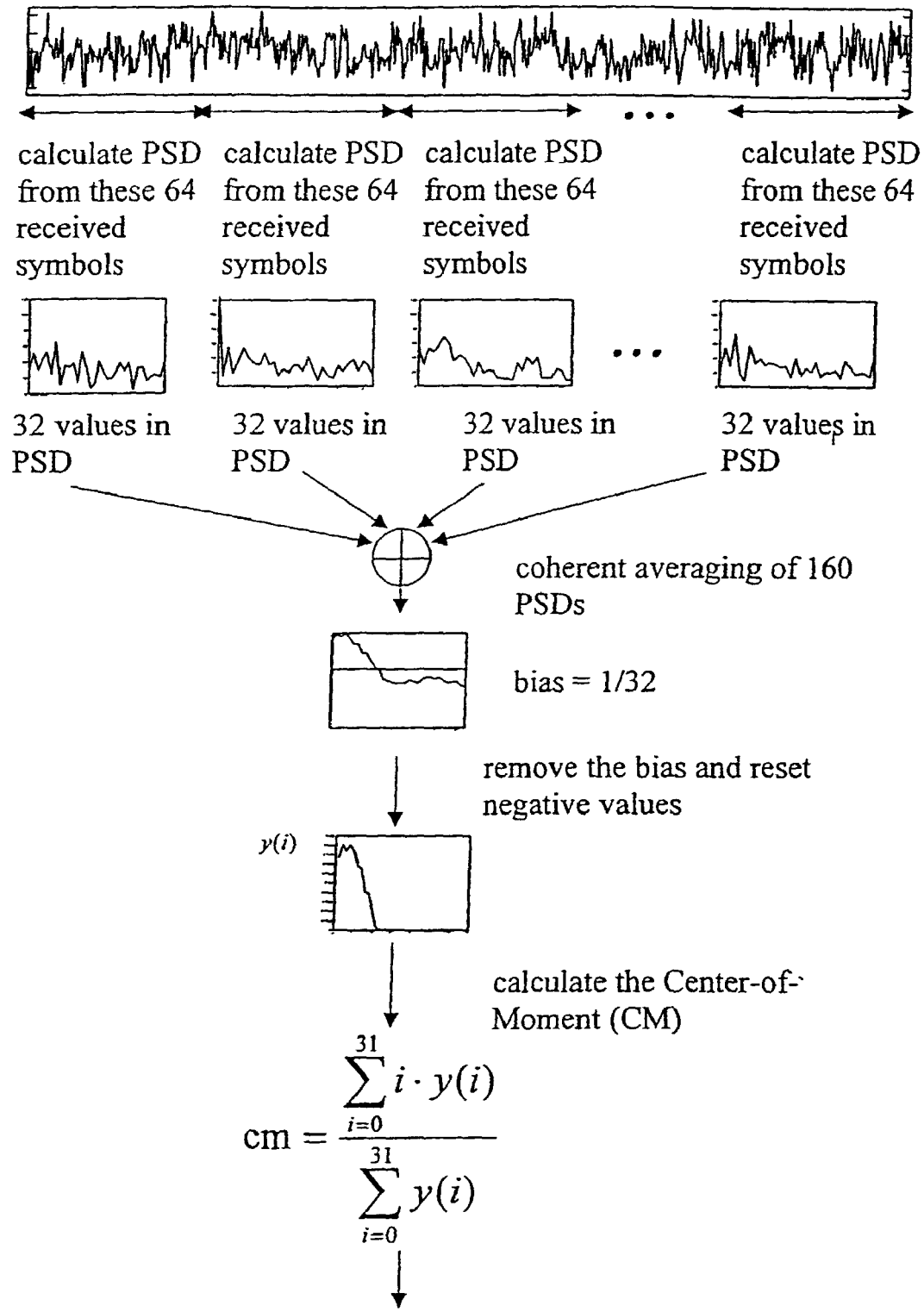
FIG. 4 illustrates a blind rate classification algorithm according to one embodiment of the invention.

The classification of the received signal can be accomplished by examining the frequency content of the received signal, e.g. by means of an estimated one-sided Power Spectral Density (PSD) function of the received signal, as is shown in FIG. 4. This is based on the realization that an N-point PSD function of the signal can be defined for an N-point complex time domain signal, said function providing information about the frequency content of the signal. A crude estimate of the PSD function for a signal x can be calculated from a Fourier Transform (FT) of the signal x by equation:

$$PSD(x)=Re(FT(x))*Re(FT(x))+Im(FT(x))*Im(FT(x)) \quad (1)$$

The PSD function includes N real values, and the relative amplitudes of these values can be translated to the relative amount of different frequencies present in the signal, starting from the frequency f=0 as the first element of the PSD function and spanning a frequency range up to the Nyquist critical frecuency $$f_c = \frac{1}{2T_s}, \quad (2)$$

where $T_s$=symbol time of one received symbol, despread by using a spreading factor of 4. Now, as one 10 ms radio frame includes 16*10*64=10240 such symbols, the symbol time is:

$$T_s=10 \text{ ms}/10240=0.977 \text{ µs}$$

and thus $$f_c = \frac{1}{2 \cdot 0.977 \text{ µs}} = 512 \text{ kHz}.$$

The above corresponds to a data rate of 512 kbps, which means that in this embodiment, i.e. with a sampling rate of 0.977 µs (using a spreading factor of 4) it is not possible to separate data rates over 512 kbps in the PSD function. This is caused by the nature of the Fourier transform algorithm, i.e. two samples for each transmitted symbol are required in the receiver in order to be able to distinguish by a Fourier transform a certain data rate (frequency). Since the data rate 1024 kbps means that a spreading factor of 4 is used in the transmitter, a spreading factor of 2 should then be used in the receiver to get 2 samples of each transmitted data symbol.

In general, having only $f_c$=512 kHz means that in the highest data rate case the frequencies over 512 kHz are aliased to the PSD function, that is, they are mapped somewhere between 0 and 512 kHz. However, this does not have any disadvantageous effect to the embodiment, since it is not necessary to analyze directly the frequency content of the signal (that is, the relative amplitudes of the PSD function). Instead, the aim of this procedure is to interpret the frequency content of the signal so that a single decision variable for classification purposes is obtained. Examples of the calculations for receiving the variable will be explained later in this specification.

To estimate the PSD of the received 10240 real symbols of one radio frame, it is possible to accomplish the estimation procedure directly by calculating the Fourier transform of all 10240 symbols and to subsequently calculate from the Fourier transform a PSD estimate. This basic PSD method is enough for enabling an implementation of the above method. However, a preferred procedure discussed in the following will yield to even better results.

When the total number of received symbols P=10240, the P symbols are divided to K blocks of N consecutive points in each block. In this example N=64, so K=P/N=160. N/2-point FT is then calculated to each block of N real symbols separately. Denoting M=N/2 yields to M(=32) complex values per each FT. The M-point real PSD function estimate can then be calculated to each data block by summing the squared real and imaginary points for each frequency (see equation (1)). Finally, the final PSD function estimate is calculated by averaging these K individual PSD function estimates.

This procedure has been found to reduce the variance of the PSD function estimate by a factor of $\sqrt{K}$(=12.65) from the basic PSD method. The latter method is also in most cases computationally more efficient, since the Fourier transforms of the signal are usually calculated with some kind of Fast Fourier transform (FFT) algorithm, and those algorithms are generally $\log_2(N)$–complex. Thus, even though both method can be used, it is in most cases logarithmically more efficient to use several short FFTs than to use one long FT.

Computationally, the biggest burden of the above method lies in calculating the 32-point complex Fourier transform to the 64 real symbols of a certain block. However, the complexity of the algorithm can be significantly reduced by using a clever FFT algorithm, preferably one that has been especially modified to take into account certain symmetries concerning the FTs of real data. Such algorithms are per se known, and are thus not discussed in more detail herein.

In pseudo-code representation, the estimation of the PSD function can be written now as:

divide input data to K blocks, N consecutive data symbols in each block;
    M=N/2;
    for i :=1 to K
        x :=all N real data symbols belonging block i;
        /* The M=N/2 real points of the FFT are returned to fx, and the imaginary points to fy */
        FFT_REAL(x, N, fx, fy);
        for j :=1 to M
            psd(j):=psd(j)+[fx(j)*fx(j)+fy(j)*fy(j)];
        end for j
    end for i
    divide all elements of psd( ) by K;

After the K M-point PSD functions have been averaged to one M-point PSD function estimate, it may be advantageous to normalise the estimate so that the total power of the PSD function is 1. The normalisation is done by summing all the M elements of the psd( ) and dividing all elements by this sum. By means of this the sum of the elements of the PSD function, called as PSD bins, is 1.

When considering Additive White Gaussian Noise (AWGN) of the signal, one of its properties is that it is white, i.e. non-selective. In other words, the noise extends equally to all frequencies. From the point of view of the PSD function, this would mean that the PSD function of the AWGN would be just a flat line with the value of each bin=1/M. For a signal of distinct frequencies of 0 . . . $f_c$ plus the AWGN noise in the signal, the PSD function would thus show a bias of 1/M, and for the distinct frequencies the corresponding bin of the PSD function would be greater than 1/M. Since the proposed estimation method is only interested of the frequencies whose relative amount in the PSD function exceeds the noise, 1/M can be subtracted from the PSD function and all possible resulting negative bins can be reset to zero.

In pseudo-code representation, the normalisation and bias removal operations can be written as NORMALISE (psd, M);
for i :=1 to M
  psd(i) :=psd(i)–1/M;
  if psd(i)<0
    psd(i) :=0;
  end if
end for i Before the actual classification of the incoming signal, a final data rate decision variable has to be calculated. As mentioned above, the shape of the PSD function gives information about its frequency content. It has been realized that for a transmission of lower data rates, e.g. 32 kbps, the PSD function of the received signal is concentrated more to the lower bins, whereas for a transmission of higher data rates, e.g. 1024 kbps, much higher frequencies are present in the signal. Thus the relative amount of the higher bins present in the PSD function has to be bigger. In order to be able to utilize this realization, a variable characterising the frequency content of the PSD function is calculated. A possible variable for this is so called center-of-moment (CM) of the PSD function:

$$CM = \frac{\sum_{i=1}^{M} i \cdot psd(i)}{\sum_{i=1}^{M} psd(i)} \quad (3)$$

The meaning of the CM variable is as follows: the bigger the CM, the bigger the relative amount of the higher frequencies that are present in the PSD function, and thus it is more probable that the transmitter bit rate was relatively high.

Figure 5:
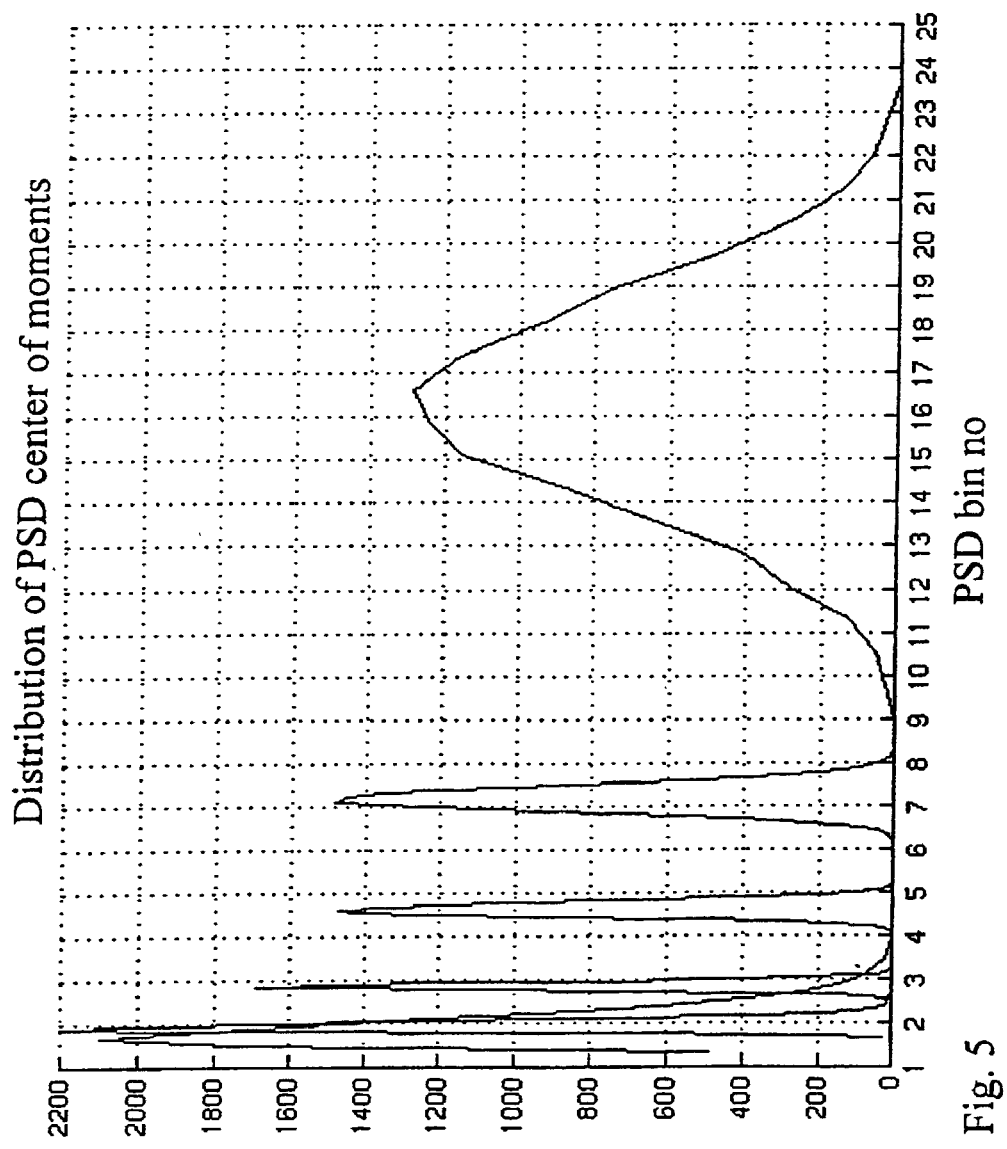
FIG. 5 is a diagram showing simulated distributions of variables for different data rates.

The above algorithm has been tested by extensive simulations accomplished by a MATLAB simulation software provided by The MathWorks Inc. The distributions of the PSD center-of-moment variable for various transmission data rates are illustrated in FIG. 5 by a histogram in which the horizontal axis defines the number of the PSD bins and the vertical axis defines the number of events. The number of events axis could also be presented in the normalised form, i.e. 0 to 1 instead of the range from 0 to 2200. The distribution curves for different data rates are from left to right: 32, 64, 128, 256, 512, and 1024 kbps. As can be seen from FIG. 5, the higher data or bit rates (256 and above) are very clearly distinguished from each other, which leads to a reliable detection of the higher bit rates.

It is possible to define the distribution of the CM variables for all used (and thus possible) transmitter data rates (32, 64, 128, 256, 512, and 1024 kbps in the example). Based on the predefined distributions, it is then possible to set classification limits for the actual data rate decision. The transmitter data rate estimate can thus be provided by means of the CM variable calculation, followed by a classification of the variable in accordance with a predefined classification rules, e.g. by an estimation structure making use of the predefined classification limits. The actual data rate can then be defined directly from the class.

One possible decision structure for the final estimation is shown below in pseudo-code representation, wherein sf=estimate of the spreading factor used in the transmitter:

CALC_CM (psd, M, cm);
if cm<1.8
  sf :=128;
else if cm>=1.8 and cm<2.5
  sf :=64;
else if cm>=2.5 and cm<3.7
  sf :=32;
else if cm>=3.7 and cm<5.5
  sf :=16;
else if cm>=5.5 and cm<8.6
  sf :=8;
else if cm>8.6
  sf :=4;
end if The above structure has shown reasonable performance in the accomplished simulations. It is noted that the above decision limits are only tentative. In addition, the above illustrated number of data transmission rate classes is only one example of the possible number of classes. Different limit values can be used in different embodiments, and the number of data transmission rate classes can be freely chosen for different implementations.

It is also noted that even though in a preferred embodiment the number of the data rate classes corresponds the number of the possible transmitter data rates, the number of the classes does not necessarily need to correspond the number of the different possible transmitter data rates. For instance, a lower number of classes can be used such that two or several of the lower transmitter data rates are included in one data rate class, thereby simplifying the classification procedure and avoiding possible problems caused by the occasionally interleaving distributions of the variables for the lower data rates. In addition, instead of using the actual data rates, the data rate classes can also be denoted as, for example, low, relatively low, medium, relatively high, and high and such that some or all of the classes include more than one transmitter data rate.

The accomplished simulations proved that the above embodiment does not seem to suffer from the low signal-to-noise ratios, as is the case in the prior art power-based method discussed earlier in this specification. The simulations were done with the $E_s/N_0$=10 dB, where the power-based method failed to detect any data rates of the received transmission. At this $E_s/N_0$ magnitude the above described embodiment, however, achieved the following probabilities of correct data rate detection (the simulation was accomplished for 10000 radio frames)

| Transmitter data rate [kbps] | Probability of correct data rate detection [%] |
|---|---|
| 32 | 46.85 |
| 64 | 92.25 |
| 128 | 100 |
| 256 | 100 |
| 512 | 100 |
| 1024 | 100 |

When compared to the described prior art methods based on the CRC decoding and the metrics of the Viterbi decoding, the above embodiment has an advantage in that the data rate estimation is not delayed to after the decoding process. Therefore the embodiment is more suitable to e.g. different Interference Cancellation methods in the receiver that the prior art proposes. Moreover, the above described method is less complex than the methods based on CRC or Viterbi decoding of the data.

As can be seen from FIG. 5 and the above table, the described embodiment may not reliably separate in all occasions the lowest data rates of 32 and 64 kbps from each other. This is due the fact that every higher data rate is an integer multiple of two of a lower data rate, the data rates 32 and 64 kbps being relatively close to one another. Because of that, the distributions of the decision variable (CM) may overlap. If the incorporation of the lower data rates into one class is not desired and a better performance in the separation of the lowest data rates is required (at the cost of the separation of the higher data rates), the sampling rate of the receiver could be decreased, for example, by increasing the spreading factor from 4 to 16 in the receiver.

If the length of the Fourier transform is kept the same (e.g. 64), this would lead to decrease in the critical Nyquist frequency $f_c$, thus improving the frequency resolution at the lower frequencies while at the same time narrowing the window of the detectable frequencies. It is to be noted that this process may in some occasions lead to heavy aliasing to the frequencies higher than $f_c$, if they are still present in the system (i.e. there is a probability that e.g. 1024 kbps might still be used in the transmitter). This aliasing effect, however, can be readily reduced by using low-pass filtering to the received signal prior to the data rate detection.

Although the invention has been described in the context of a CDMA based system, it will be appreciated that similar principles can be applied in other communication systems, for example in a TDMA system or in any telecommunications device receiving data at variable rates and requiring information of the data transmission rate, such as in modems.

While the invention has been described above in connection with the blind data rate detection, the described data rate estimation method could be used together with rate information bits or similar data rate information in order to produce verified and/or corrected data rate estimate. In this case a connection is to be provided between rate estimator unit 40 and channel estimation unit 37 or similar unit of the circuitry accomplishing the verification/correction. This is a viable alternative especially in implementations having high requirements for the accuracy of the transmission rate estimation.

It is also noted herein that while the above describes exemplifying embodiments of the invention, there are several variations and modifications which may be made to the disclosed solution without departing from the scope of the present invention as defined in the appended claims.

The invention claimed is:

1. A method for estimating data transmission rate in a communication system with variable data transmission rate wherein a transmission signal includes a plurality of data symbols over a sequence of data frames, comprising:
    classifying a data frame of a received transmission signal in accordance with a predefined classification of the data transmission rates; and
    estimating the data transmission rate of the received data frame on basis of said classification;
    wherein the data frames are classified based on a power spectral density function estimate of the received transmission signal; and
    wherein the estimation of the power spectral density function comprises the steps of:
    dividing the total number of received data symbols into blocks, wherein each block includes a predefined amount of consecutive points of the signal;
    calculating an individual Fourier Transform for each of said blocks for receiving squared real and imaginary points for each frequency of the signal;
    calculating an individual power spectral function estimate of each of the blocks by summing the squared real and imaginary points; and
    calculating the power spectral density function estimate by averaging the individual power spectral function estimates.

2. A method for channel estimation in a cellular code division multiple access communication system wherein a plurality of data symbols is spread over a sequence of data frames in a transmission signal with variable data transmission rates, comprising:
    classifying a data frame of a received transmission signal in accordance with a predefined classification of the data transmission rates; and
    estimating the data transmission rate of the received data frame on basis of said classification;
    wherein the data frames are classified based on a power spectral density function estimate of the received transmission signal; and
    wherein the estimation of the power spectral density function comprises the steps of:
    dividing the total number of received data symbols into blocks, wherein each block includes a predefined amount of consecutive points of the signal;
    calculating an individual Fourier Transform for each of said blocks for receiving squared real and imaginary points for each frequency of the signal;
    calculating an individual power spectral function estimate of each of the blocks by summing the squared real and imaginary points; and
    calculating the power spectral density function estimate by averaging the individual power spectral function estimates.

3. Signal receiving circuitry for use in a communication system with variable data transmission rates wherein data is transmitted as a plurality of data symbols over s sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame;
    wherein the rate estimation unit is arranged to classify the received signal based on a power spectral density function estimate of the received transmission signal; and
    wherein the rate estimation unit is arranged to estimate the power spectral density function by
    dividing the total number of received data symbols into blocks, wherein each block includes a predefined amount of consecutive points of the signal;
    calculating an individual Fourier Transform for each of said blocks for receiving squared real and imaginary points for each frequency of the signal;
    calculating an individual power spectral function estimate of each of the blocks by summing the squared real and imaginary points; and
    calculating the power spectral density function estimate by averaging the individual power spectral function estimates.

4. A mobile station including signal receiving circuitry arranged for use in communication via a communication system with variable data transmission rates wherein data is transmitted as a plurality of data symbols over a sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame,
    wherein the rate estimation unit is arranged to classify the received signal based on a power spectral density function estimate of the received transmission signal; and
    wherein the rate estimation unit is arranged to estimate the power spectral density function by
dividing the total number of received data symbols into blocks, wherein each block includes a predefined amount of consecutive points of the signal;
    calculating an individual Fourier Transform for each of said blocks for receiving squared real and imaginary points for each frequency of the signal;
    calculating an individual power spectral function estimate of each of the blocks by summing the squared real and imaginary points; and
    calculating the power spectral density function estimate by averaging the individual power spectral function estimates.

5. A base station including signal receiving circuitry for use in communication with variable data transmission rates wherein data is transmitted as a plurality of data symbols over a sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame,
    wherein the rate estimation unit is arranged to classify the received signal based on a power spectral density function estimate of the received transmission signal; and
    wherein the rate estimation unit is arranged to estimate the power spectral density function by
dividing the total number of received data symbols into blocks, wherein each block includes a predefined amount of consecutive points of the signal;
    calculating an individual Fourier Transform for each of said blocks for receiving squared real and imaginary points for each frequency of the signal;
    calculating an individual power spectral function estimate of each of the blocks by summing the squared real and imaginary points; and
    calculating the power spectral density function estimate by averaging the individual power spectral function estimates.

6. A method for estimating data transmission rate in a communication system with variable data transmission rate wherein a transmission signal includes a plurality of data symbols over a sequence of data frames, comprising:
    classifying a data frame of a received transmission signal in accordance with a predefined classification of the data transmission rates; and
    estimating the data transmission rate of the received data frame on basis of said classification;
    wherein the data frames are classified based on a power spectral density function estimate of the received transmission signal; and
    wherein the classification comprises further:
    calculating a variable from the power spectral density function for characterising the frequency content of the power spectral density function; and
    comparing the variable against limit values of a classification decision structure, wherein the variable characterising the frequency content of the received transmission signal comprises center-of-moment of the power spectral density function.

7. A method for channel estimation in a cellular code division multiple access communication system wherein a plurality of data symbols is spread over a sequence of data frames in a transmission signal with variable data transmission rates, comprising:
    classifying a data frame of a received transmission signal in accordance with a predefined classification of the data transmission rates; and
    estimating the data transmission rate of the received data frame on basis of said classification;
    wherein the data frames are classified based on a power spectral density function estimate of the received transmission signal; and
    wherein the classification comprises further:
    calculating a variable from the power spectral density function for characterising the frequency content of the power spectral density function; and
    comparing the variable against limit values of a classification decision structure, wherein the variable characterising the frequency content of the received transmission signal comprises center-of-moment of the power spectral density function.

8. Signal receiving circuitry for use in a communication system with variable data transmission rates wherein data is transmitted as a plurality of data symbols over s sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame;
    wherein the rate estimation unit is arranged to classify the received signal based on a power spectral density function estimate of the received transmission signal; and
    wherein the classification comprises further:
    calculating a variable from the power spectral density function for characterising the frequency content of the power spectral density function; and
    comparing the variable against limit values of a classification decision structure, wherein the variable characterising the frequency content of the received transmission signal comprises center-of-moment of the power spectral density function.

9. A mobile station including signal receiving circuitry arranged for use in communication via a communication system with variable data transmission rates wherein data is transmitted as a plurality of data symbols over a sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame;

wherein the rate estimation unit is arranged to classify the received signal based on a power spectral density function estimate of the received transmission signal; and wherein the classification comprises further:

calculating a variable from the power spectral density function for characterising the frequency content of the power spectral density function; and comparing the variable against limit values of a classification decision structure, wherein the variable characterising the frequency content of the received transmission signal comprises center-of-moment of the power spectral density function.

10. A base station including signal receiving circuitry for use in communication with variable data transmission rates wherein data is transmitted as a plurality of data symbols over a sequence of data frames, the signal receiving circuitry comprising a rate estimation unit for receiving an incoming transmission signal, for classifying a data frame of the signal in accordance with a predefined classification of the data transmission rates, and for determining from the results of the classification an estimate of the data transmission rate of the received data frame;

wherein the rate estimation unit is arranged to classify the received signal based on a power spectral density function estimate of the received transmission signal; and wherein the classification comprises further:

calculating a variable from the power spectral density function for characterising the frequency content of the power spectral density function; and comparing the variable against limit values of a classification decision structure, wherein the variable characterising the frequency content of the received transmission signal comprises center-of-moment of the power spectral density function.

\* \* \* \* \*